INVENTORS
ROBERTS KITCHENER LYNES
JOHN MARDEN WILLIS
JOHN WILLIAM TAYLOR

United States Patent Office 3,484,074
Patented Dec. 16, 1969

3,484,074
ELECTROMAGNETICALLY OPERATED VALVE WITH POLARITY REVERSING SWITCH
Roberts Kitchener Lynes, Moseley, John Marden Willis, Clent, and John William Taylor, Acocks Green, England, assignors to Roberts Kitchener Lynes and Bullfinch (Gas Equipment) Limited, Birmingham, England
Filed Apr. 24, 1967, Ser. No. 633,051
Claims priority, application Great Britain, May 7, 1966, 20,325/66
Int. Cl. F16k 15/18, 31/08
U.S. Cl. 251—65                              9 Claims

ABSTRACT OF THE DISCLOSURE

An electromagnetically operated fluid valve comprises a body incorporating fluid inlet and outlet passages and an electromagnetically displaced member for controlling communication between the inlet and outlet passage. The member comprises a magnet and closes one passage when at least one of two poles of the magnet is simultaneously attracted and repelled with respect to two fixed electromagnetic pole pieces. The electromagnet energizing circuit includes a selective switch for reversing polarity of the pole pieces and an automatic switch actuated by movement of the member to break the circuit.

---

This invention relates to an electromagnetically operated valve for controlling fluid flow, and has for its principal object such a valve which is of simple and reliable construction. A subsidiary but important object of the invention is the provision of such a valve wherein electric current is only consumed by the valve during actuation of the valve.

In accordance with the invention an electromagnetically operated fluid flow valve comprises a body, fluid inlet and outlet passages, and an electromagnetically displaced member for controlling communication between the inlet and outlet passages, characterized in that the electromagnetically displaced member comprises a magnet which closes one of the passages when at least one of its two poles is simultaneously attracted and repelled with respect to two fixed pole pieces.

Figure 1:
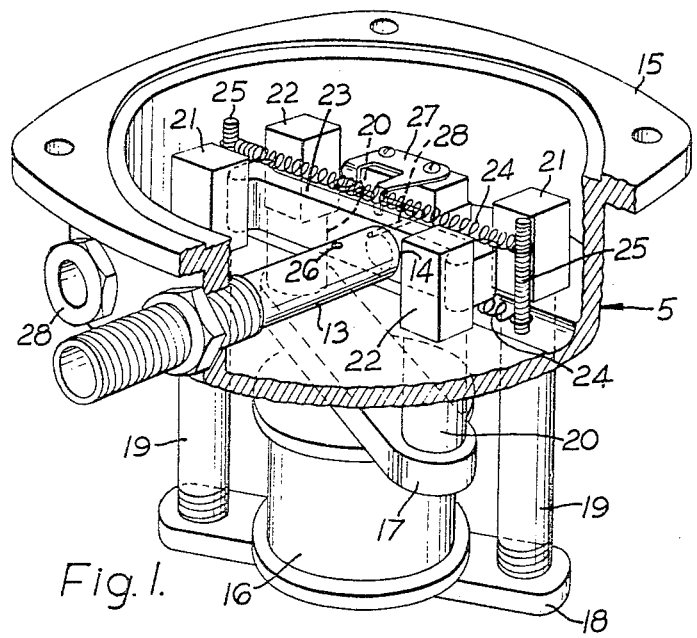
Figure 2:
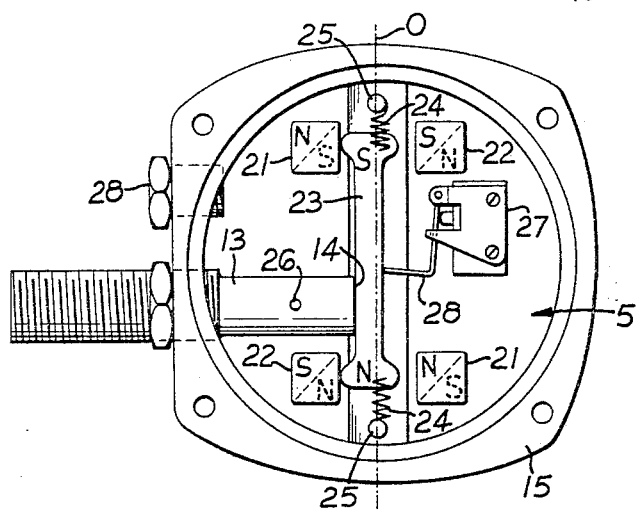
Figure 3:
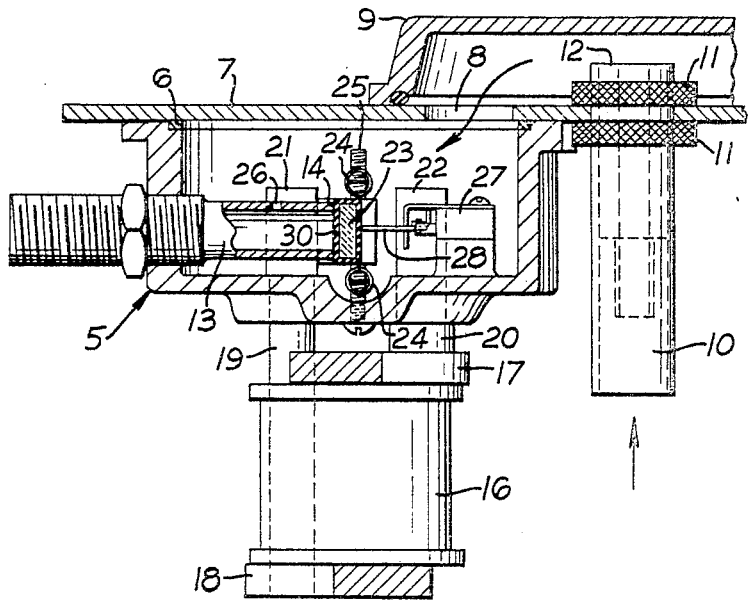
Figure 4:
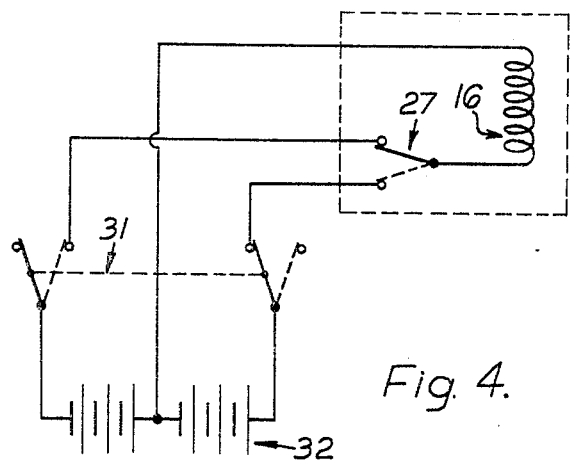

A preferred embodiment of the invention is described, by way of example only, with reference to the accompanying drawings wherein:

FIGURE 1 is a part sectional perspective view of an ON/OFF gas valve according to the invention with certain parts omitted for the sake of clarity, FIGURE 2 is a plan view of the parts of FIGURE 1, FIGURE 3 is a part section of side elevation of an assembly including the parts of FIGURE 1, and FIGURE 4 is an electric circuit diagram illustrating the control of the valve of FIGURE 1.

The ON/OFF gas valve illustrated in FIGURES 1, 2 and 3 comprises a cup-like valve body 5 composed of non-ferrous metal having a peripheral flange 15 mounted by bolts (not shown) and a seating ring 6 on a cover plate 7 which in the form shown in FIGURE 3 is intended to be shared by several valves. The gas inlet aperture 8 in the cover plate 7 gives communication between the body interior and a manifold 9 which again serves several valves. A gas inlet pipe 10 is mounted by threaded collars 11 on the cover plate 7 so that its outlet 12 opens within the manifold. A gas outlet pipe 13 has a screwed mounting in the wall of the body 5 with its flat inlet end 14 disposed parallel and adjacent to a diametrical median plane O of the cup-shape body.

Externally of the body 5 an electromagnetic coil 16 wound about a soft iron core (not shown) has two ends of its core abutting respective soft iron yokes 17 and 18. The pairs of ends of the yokes 17 and 18 are angularly offset relatively and to the median plane as best shown in FIGURE 1, and are connected by pairs of soft iron posts 19, 20 to respective pairs of soft iron pole pieces 21 and 22 upstanding inside the body 5 so that the pole pieces of each pair are disposed on opposite sides of the median plane O with one pair directly opposite the other pair defining a gap therebetween.

A permanent magnet 23 of I-shape in plan is located in the gap between a pair of stretched parallel helical tension springs 24 having their ends anchored about a pair of upstanding bolts 25 mounted in the body 5. By means of these springs 24 the magnet 23 is constrained to move so that one side or other of its laterally projecting ends respectively abut the two pole pieces 21 and 22 on one side or other of the median plane O to which they are magnetically attracted by the permanent magnetism. In the position of the magnet 23 shown in the drawings, one side of the magnet abuts the outlet pipe ends 14 so as to close the pipe, whereas in the alternative position of the magnet 23 the pipe end 14 is open.

It is found that the effort needed to release the magnet 23 from the pole pieces is reduced by spacing the magnet from the pole pieces. This spacing is provided by a synthetic plastic covering 30 of the magnet.

A hole 26 can be provided in the cylindrical wall of the outlet pipe to afford a pilot gas flow when the pipe end 14 is closed.

Also within the valve body is mounted a two-way single pole microswitch 27 having a bell cranked actuating lever 28 pivotally mounted at one end on the switch body with the tip of its opposite end abutting a side of the magnet 23, the arrangement being such that movement of the magnet between its two alternative positions on opposite sides of the median plane actuates a switch to cause a changeover of its contacts. The leads to the microswitch 27, which are omitted from the drawings for clarity, are led out of the body through a gastight gland 28.

The electric control circuit of the valve shown in FIGURE 4 consists of a two pole two-way switch 31 having its two poles connected between the respective ends of a low-tension battery 32 and the two fixed contacts of the microswitch 27. The moving contact of the microswitch 27 is connected to one end of the coil 16 and the other end of the latter is connected to a centre tap of the battery. Thus the arrangement is such that actuation of the switch 31 serves to reverse the polarity of the voltage across coil 16.

The operation of the valve is as follows. In the position of the parts illustrated, the current to the coil 16 is interrupted by the microswitch 27 and the gas admitted through the inlet pipe 10, manifold 9, and cover plate aperture 8, to the interior of the valve body 5 is arrested by the closure of the outlet pipe mouth 14 by the magnet 23, the latter being maintained in this position by its permanent magnetic attraction to the two pole pieces 21, 22 on the side of the median plane O nearest the pipe end 14. To open the valve, the switch 31 is actuated to reverse the polarity of the current supplied to the coil as compared with that given in the previous switch position. Assuming that the polarity of the magnet 23 is as shown in FIGURE 2 then current flowing through the coil 16 produces a magnetic circuit, to produce the polarity indicated in FIGURE 2 in broken lines, with the result that the permanent magnet 23 is repelled from the two pole pieces on the side of the median plane O nearer the pipe end 14 and is simultaneously attracted to the two pole pieces on the opposite side of the median plane. Thus the magnet 23 moves across the gap to open the pipe end 14 and permit gas flow through the latter.

As the magnet 23 moves across the gap it displaces the bell crank lever 28 to cause the micro switch 27 to changeover its contacts and so interrupt the current to the coil 16. However, despite the cessation of current, the magnet 23 is attracted to abut and remain in abutment with the pole pieces towards which it was moving by reason of its permanent magnetism and the residual magnetism of the pole pieces. To close the valve the switch 31 is again actuated causing a reversal of the polarity of the current fed to the coil 16 through the microswitch 27 which was pre-set for this function at its last actuation. Thus the polarity of the pole pieces is reversed (to assume that indicated in full lines in FIGURE 2), and the magnet 23 is moved across the gap with accompanying interruption of the current to the coil exactly as before.

It will be realised that the above described valve is of particularly simple construction without requiring parts made to close tolerances. Further, the valve possesses the important advantage that it only requires low-tension current for its operation and that this current is only consumed at the short period of changeover of the valve with resultant economy in battery life. Also, the valve is particularly suited for remote control, including for example, by radio signals operating a relay type of switch 31.

In a modification the permanent magnet 23 can be replaced by an electromagnet and reversal of current fed to this magnet can be utilised to effect its movement between valve closing and opening positions. To facilitate the problems of feeding current to the electromagnet this can be pivoted at one end remote from the gas passage which it controls instead of moving bodily, and can cooperate with a single pair of pole pieces also remote from the pivot. A two-way gas valve can be constructed by provision of a second gas outlet pipe having an end which is closed by the magnet 23 when the first pipe end 14 is open, and vice-versa.

We claim:

1. An electromagnetically operated fluid valve comprising a body having fluid inlet and outlet passages, a valve member comprising a magnet mounted within said body for movement between a first position where it closes one of said passages and a second position where it permits fluid flow through both passages, electromagnetic means including at least one pair of fixed pole pieces disposed respectively on opposite sides of one pole of said magnet and an electrical circuit, switching means in said circuit for energizing the circuit to oppositely polarize said pole pieces whereby said magnet pole is simultaneously attracted and repelled with respect to said pole pieces to move said member into one of said first and second positions, said switching means being operable to effect reverse polarization of said pole pieces to move said member into the other of said first and second positions, and a further switch means in said circuit actuated by movement of said member into either of said first and second positions for automatically breaking said circuit.

2. An electromagnetically operated fluid valve according to claim 1 characterized in that said magnet is a permanent magnet.

3. An electromagnetically operated fluid valve according to claim 1 characterised by there being two pairs of said fixed pole pieces which simultaneously attract and repel the two opposed poles of said magnet to produce bodily movement of said member.

4. An electromagnetically operated fluid valve according to claim 1 characterised in that said member consist of a magnet covered by a non-magnetic material to space the magnet slightly away from each pole piece to which it is magnetically attracted.

5. An electromagnetically operated fluid valve according to claim 1 characterised in that one side of said member has direct contact with the open inner end of one of said fluid passages to close that passage while being magnetically attracted to the corresponding pole piece.

6. An electromagnetically operated fluid valve according to claim 1, characterised by said member being disposed between a parallel pair of stretched helical tension springs to constrain said member to move between said pole pieces.

7. An electromagnetically operated fluid valve according to claim 1 characterised by said further switch means which is actuated by movement of said member comprising a microswitch within said body having an operating lever extending into contact with said member.

8. An electromagnetically operated fluid valve according to claim 3 characterised in that said magnet is of substantially I-shape with pairs of lateral extensions on respective sides of the length of the magnet for alternative abutment with said pairs of pole pieces on respective sides of the length of the magnet.

9. An electromagnetically operated fluid valve according to claim 3 characterized in that said electromagnetic means comprises a ferromagnetic core within an electromagnetic coil and connected by respective ferromagnetic and angularly offset yokes to the respective pairs of pole pieces.

References Cited

UNITED STATES PATENTS

| 2,310,562 | 2/1943 | Whittington | 251—65 |
| 2,575,086 | 11/1951 | Atchison | 251—65 |
| 2,777,993 | 1/1957 | Braden | 251—65 X |
| 2,962,593 | 11/1960 | Thomas | 251—65 X |
| 3,206,160 | 9/1965 | Bennett | 251—65 |
| 3,368,788 | 2/1968 | Padula | 251—65 |

FOREIGN PATENTS 27,345   1909   Sweden.

ARNOLD ROSENTHAL, Primary Examiner

U.S. Cl. X.R.

251—129, 141